United States Patent
Onomura et al.

(10) Patent No.: US 11,086,020 B2
(45) Date of Patent: Aug. 10, 2021

(54) POSITION MEASUREMENT SYSTEM FOR MOVABLE BODY

(71) Applicant: SUBARU CORPORATION, Tokyo (JP)

(72) Inventors: Yoichi Onomura, Tokyo (JP); Iwao Murata, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 208 days.

(21) Appl. No.: 16/158,451

(22) Filed: Oct. 12, 2018

(65) Prior Publication Data

US 2019/0146093 A1 May 16, 2019

(30) Foreign Application Priority Data

Nov. 10, 2017 (JP) .............................. JP2017-216953

(51) Int. Cl.
*G01S 19/10* (2010.01)
*H04N 5/247* (2006.01)
(Continued)

(52) U.S. Cl.
CPC .............. *G01S 19/10* (2013.01); *G01S 19/07* (2013.01); *G06T 7/73* (2017.01); *H04N 5/247* (2013.01); *G06T 2207/30252* (2013.01)

(58) Field of Classification Search
CPC ........... G01S 19/07; G01S 19/10; G06T 7/73; H04N 5/247
See application file for complete search history.

(56) References Cited

U.S. PATENT DOCUMENTS

| 4,914,734 A | * | 4/1990 | Love | G01C 21/005 |
| | | | | 342/53 |
| 2003/0135327 A1 | * | 7/2003 | Levine | G01C 23/00 |
| | | | | 701/500 |

(Continued)

FOREIGN PATENT DOCUMENTS

| JP | 10-213432 A | 8/1998 |
| JP | 2002-148071 A | 5/2002 |

(Continued)

OTHER PUBLICATIONS

Notice of Reasons for Refusal issued in corresponding Japanese Application No. 2017-216953 dated Jan. 21, 2021, with machine translation.

(Continued)

*Primary Examiner* — Dao L Phan
(74) *Attorney, Agent, or Firm* — Troutman Pepper Hamilton Sanders LLP

(57) ABSTRACT

A position measurement system includes a movable body and at least one indicator including identification information. The movable body includes an optical sensor configured to acquire an image of the indicator, an information acquisition unit configured to acquire the identification information of the indicator and a bearing of the indicator as seen from the movable body based on the image of the indicator acquired by the optical sensor, a coordinate acquisition unit configured to acquire coordinates of the indicator based on the acquired identification information of the indicator, and a position calculation unit configured to calculate a position of the movable body based on the acquired bearing of the indicator and the acquired coordinates of the indicator. The indicator includes, as the identification information, at least one of a unique reflection (Continued)

spectrum, a spectrum change pattern, a hue change pattern, a brightness change pattern, or a temperature change pattern.

10 Claims, 7 Drawing Sheets

(51) Int. Cl.
*G06T 7/73* (2017.01)
*G01S 19/07* (2010.01)

(56) References Cited

U.S. PATENT DOCUMENTS

| | | |
|---|---|---|
| 2011/0150285 A1 | 6/2011 | Kimura |
| 2012/0078451 A1 | 3/2012 | Ohtomo et al. |
| 2017/0292841 A1 | 10/2017 | Sabe et al. |
| 2018/0023974 A1 | 1/2018 | Otani et al. |
| 2019/0137274 A1 | 5/2019 | Sabe et al. |
| 2020/0159252 A1* | 5/2020 | Giuffrida ............... G01C 15/00 |

FOREIGN PATENT DOCUMENTS

| | | |
|---|---|---|
| JP | 2010-050720 A | 3/2010 |
| JP | 2010-249628 A | 11/2010 |
| JP | 2011-134058 A | 7/2011 |
| JP | 2012-71645 A | 4/2012 |
| JP | 2016-177640 A | 10/2016 |
| JP | 2017-144784 A | 8/2017 |
| WO | 2016/059930 A1 | 4/2016 |

OTHER PUBLICATIONS

Notice of Reasons for Refusal issued in corresponding Japanese Patent Application No. 2017-216953 dated Oct. 8, 2019 (with English translation).

Japanese Office Action issued in corresponding Japanese Patent Application No. 2020-045885 dated Feb. 16, 2021, with machine translation.

* cited by examiner

UNIQUE SPECTRUM

SPECTRUM CHANGE PATTERN

HUE CHANGE PATTERN

BRIGHTNESS CHANGE PATTERN

TEMPERATURE CHANGE PATTERN

POSITION MEASUREMENT SYSTEM FOR MOVABLE BODY

CROSS-REFERENCE TO RELATED APPLICATIONS

The present application claims priority from Japanese Patent Application No. 2017-216953 filed on Nov. 10, 2017, the entire contents of which are hereby incorporated by reference.

BACKGROUND

1. Technical Field

The present invention relates to a technique for measuring a position of a movable body.

2. Related Art

In the current operation control of an aircraft, high-density operation is achieved by a high-precision position measurement technique using Global Positioning System (GPS). Therefore, if the GPS devices of aircrafts suffer spoofing by false GPS signals or jamming, the positional precision required for high-density operation cannot be obtained, so it is necessary to take measures such increase in operation interval between adjacent aircrafts under instructions of an air traffic controller. In addition, when spoofing or jamming of GPS signals affects a plurality of aircrafts, the operation interval between these aircrafts need to be increased, thereby causing significant disruptions in operation schedule.

In addition, the measurement of an own aircraft position with GPS is also used widely in the operation of an unmanned aircraft (pilotless aircraft). Therefore, if a GPS device of an unmanned aircraft suffers spoofing by false GPS signals or jamming, the unmanned aircraft cannot grasp an accurate own aircraft position and may stray or fall in the worst case.

Therefore, for instance, the technique described in Japanese Unexamined Patent Application Publication (JP-A) No. 2012-71645 takes an image of a target mark including multiple circles provided in known positions using an imaging apparatus installed in a flying body and computes the positional relationship between the target marks and the flying body base on the taken images. This technique can measure own flying body position without using external signals such as GPS signals.

SUMMARY OF THE INVENTION

An aspect of the present invention provides a position measurement system for a movable body. The position measurement system includes a movable body and at least one indicator. The at least one indicator includes identification information. The movable body includes an optical sensor, an information acquisition unit, a coordinate acquisition unit, and a position calculation unit. The optical sensor is configured to acquire an image of the indicator. The information acquisition unit is configured to acquire the identification information of the indicator and a bearing of the indicator as seen from the movable body based on the image of the indicator acquired by the optical sensor. The coordinate acquisition unit is configured to acquire coordinates of the indicator based on the acquired identification information of the indicator. The position calculation unit is configured to calculate a position of the movable body based on the acquired bearing of the indicator and the acquired coordinates of the indicator. The indicator includes, as the identification information, at least one of a unique reflection spectrum, a spectrum change pattern, a hue change pattern, a brightness change pattern, or a temperature change pattern.

Another aspect of the present invention provides a position measurement system for a movable body. The position measurement system includes a movable body, a position acquisition unit and at least one transmission station. The position acquisition unit is configured to acquire information about a position of the movable body. The position acquisition unit is provided at known coordinates. The at least one transmission station is configured to transmit data to the movable body. The transmission station includes a transmitter configured to transmit data about the position of the movable body acquired based on the information about the position of the movable body acquired by the position acquisition unit to the movable body using at least one of a unique reflection spectrum, a spectrum change pattern, a hue change pattern, a brightness change pattern, or a temperature change pattern.

DETAILED DESCRIPTION

Examples of the present invention will be described with reference to the drawings. Note that the following description is directed to illustrative examples of the disclosure and not to be construed as limiting to the technology. Factors including, without limitation, numerical values, dimensions, shapes, materials, components, positions of the components, and how the components are coupled to each other are for purposes of illustration to give an easier understanding of the technology, and are not to be construed as limiting to the technology, unless otherwise specified. Further, elements in the following examples which are not recited in a most-generic independent claim of the disclosure are optional and may be provided on an as-needed basis. The drawings are schematic and are not intended to be drawn to scale. Throughout the specification and the drawings, elements having substantially the same function and configuration are denoted with the same minerals to avoid redundant description. Illustration of elements that are not directly related to the technology is omitted.

In the technique described in JP-A No. 2012-71645, the identifying function has a limitation because the target marks have a simple shape or pattern. For instance, an aircraft cannot measure an own aircraft position based on coordinate information of a plurality of targets disposed on a flight path in advance, by discriminating and identifying the targets.

It is desirable to measure the position of a movable body such as an aircraft preferably without using external signals.

FIRST EXAMPLE

<Configuration of Position Measurement System>

First, a configuration of a position measurement system 100 according to a first example of the present invention will be described.

Figure 1:
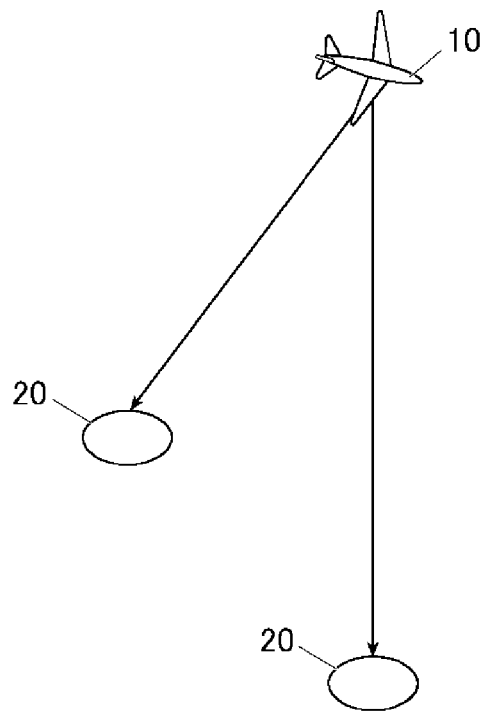
FIG. 1 is a conceptual view illustrating a position measurement system according to a first example.
Figure 2:
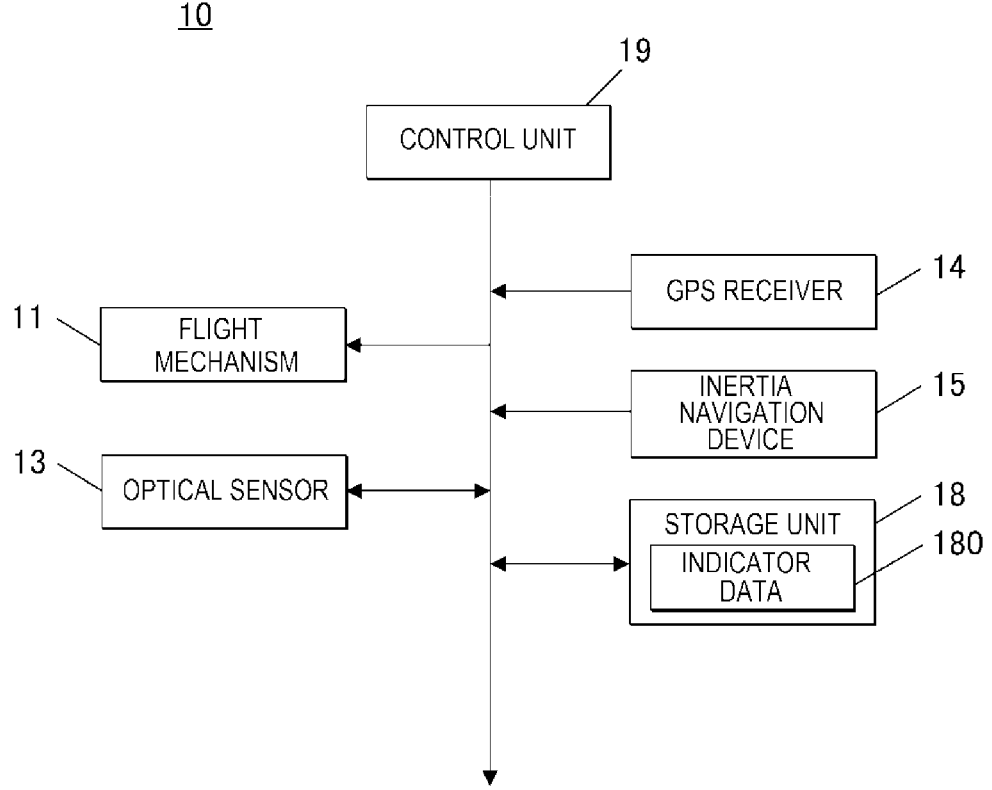
FIG. 2 is a block diagram illustrating a schematic functional configuration of an unmanned aircraft according to the first example.
Figure 3:
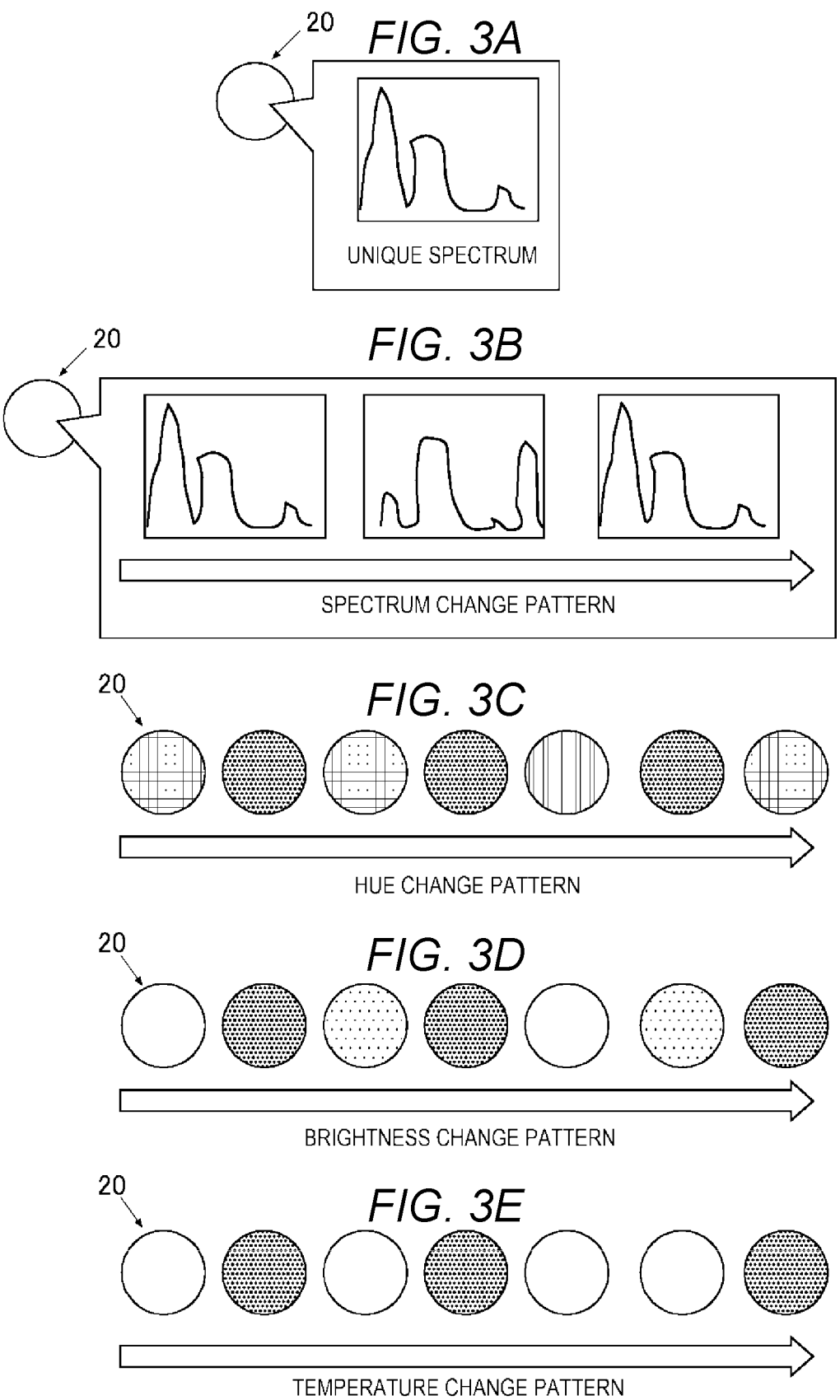
FIG. 3 illustrates a configuration example of an indicator according to the first example.

FIG. 1 is a conceptual view illustrating the position measurement system 100, FIG. 2 is a block diagram illustrating a schematic functional configuration of an unmanned aircraft 10 of the position measurement system 100, and FIG. 3 is a diagram illustrating a configuration example of an indicator 20 of the position measurement system 100.

As illustrated in FIG. 1, the position measurement system 100 includes the unmanned aircraft (pilotless aircraft) 10 and the plurality of indicators 20 (only two of them are illustrated in FIG. 1) and causes the unmanned aircraft 10 to acquire information of an own aircraft position without using external signals.

As illustrated in FIG. 2, the unmanned aircraft 10 includes an optical sensor 13, a Global Positioning System (GPS) receiver 14, an inertia navigation device 15, a storage unit 18, and a control unit 19 in addition to a flight mechanism 11 for flying the unmanned aircraft 10.

Of these components, the optical sensor 13 is an imaging unit capable of acquiring image information outside the aircraft and, in this example, acquires images of the indicators 20. This optical sensor 13 can capture identification information of the indicators 20, as described later.

The GPS receiver 14 receives GPS signals including information of an own aircraft position (current position) of the unmanned aircraft 10 from GPS satellites. This GPS receiver 14 outputs the reception situation of GPS signals and information of an own aircraft position of the unmanned aircraft 10 acquired from GPS signals to the control unit 19.

It will be appreciated that a satellite positioning system other than GPS may be used and, in that case, the GPS receiver 14 needs to be replaced with a device corresponding to that system.

The inertia navigation device 15 can measure the position, the speed, and the like of the unmanned aircraft 10 with a gyro or accelerometer without using external radio waves. This inertia navigation device 15 outputs the information of the measured own aircraft position of the unmanned aircraft 10 to the control unit 19. In addition, the inertia navigation device 15 outputs an inertia navigation position by making correction based on the own aircraft position acquired from GPS signals to reduce accumulation of error.

The storage unit 18 is a memory that stores programs and data for achieving various functions of the unmanned aircraft 10 and also functions as a work area. In the example, the storage unit 18 stores indicator data 180 in advance.

The indicator data 180 associates the identifiers of the plurality of indicators 20 with the coordinate information of the indicators 20. The identifier is information (for instance, an identification number), unique to each of the plurality of indicators 20, that identifies each of the plurality of indicators 20.

The control unit 19 performs centralized control of individual units of the unmanned aircraft 10. Specifically, the control unit 19 controls the flight of the unmanned aircraft 10 by controlling the driving of the flight mechanism 11 or controls the operation of the optical sensor 13.

The plurality of indicators 20 is arranged, for instance, along the flight path of the unmanned aircraft 10 while being fixed in different positions on the land or on the sea. However, the plurality of indicators 20 does not need to be arranged along the flight path as long as the indicators 20 can be captured by the optical sensor 13 of the unmanned aircraft 10 on the flight path.

Each of the indicators 20 has unique identification information. The "identification information" of the indicator 20 corresponds to the identifier of the indicator 20 and is acquired by encoding the identifier into a form that can be recognized and acquired by imaging in the air.

The identification information of the indicator 20 may be, for instance, a special reflection spectrum as illustrated in FIG. 3A. In this case, the optical sensor 13 needs to capture the spectrum. Since measurement at night is enabled and no change is made, one measurement only takes the imaging time for one image.

Alternatively, a panel whose spectrum changes in a certain cycle as illustrated FIG. 3B may be provided in the indicator 20 to use the spectrum change pattern as identification information.

Alternatively, a light fixture whose hue changes in a certain cycle as illustrated in FIG. 3C may be provided in the indicator 20 to use the hue change pattern as identification information. In this case, although a relatively cheap sensor capable of capturing visible light is sufficient as the optical sensor 13, this sensor cannot perform measurement at night.

Alternatively, a light fixture or the like whose brightness changes in a certain cycle as illustrated in FIG. 3D may be provided in the indicator 20 to use the brightness change pattern as identification information.

Alternatively, a panel whose temperature changes in a certain cycle as illustrated in FIG. 3E may be provided in the indicator 20 to use the temperature change pattern as identification information. In this case, although the optical sensor 13 needs to capture infrared rays, this sensor can perform measurement at night.

In addition, these types of identification information can be combined in the single indicator 20. For instance, the single indicator 20 may be provided with the hue change pattern as identification information for daytime and the reflection spectrum as identification information for nighttime. In this case, these two types of identification information correspond to one identifier representing the same indicator 20.

It should be noted here that, when using a change pattern, for instance, the beginning and the end of the pattern may be delimited by a certain lights-out time (time for which the temperature does not change).

<Position Measurement Method>

Next, a position measurement method used by the unmanned aircraft 10 on the fly acquires the own aircraft position in the position measurement system 100 according to the first example will be described.

Figure 4:
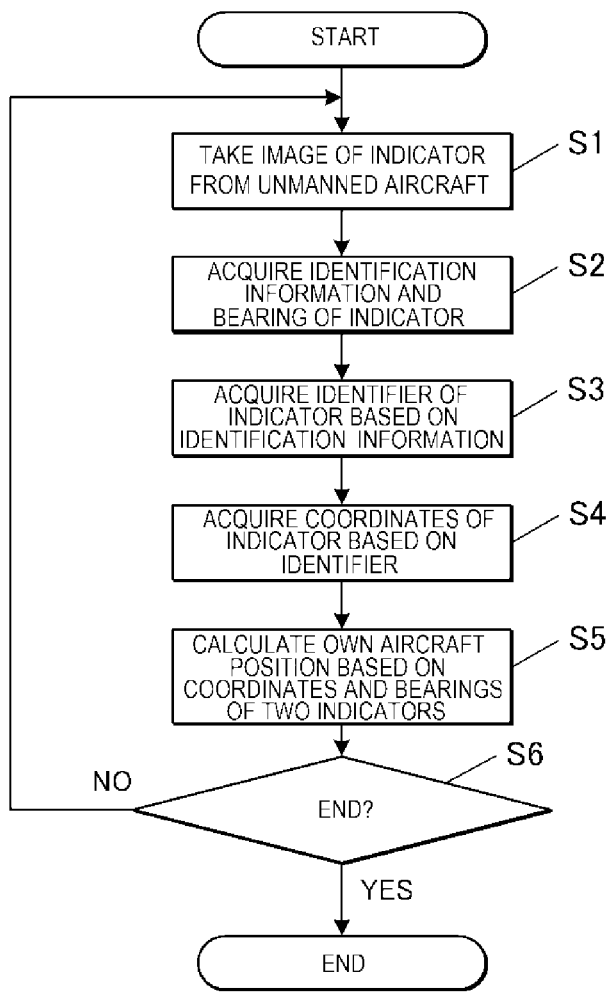
FIG. 4 is a flowchart illustrating a flow of a position measurement method by the position measurement system according to the first example.

FIG. 4 is a flowchart illustrating a flow of this position measurement method.

In the example, the position measurement by the position measurement system 100 is performed when it is determined that the reliability of position information included in GPS signals is low because the GPS receiver 14 suffers jamming or spoofing by false signals.

In this position measurement, as illustrated in FIG. 4, the control unit 19 first takes an image of the indicator 20 on the land or on the sea (step S1) with the optical sensor 13, acquires the identification information of the indicator 20, and acquires the bearing (bearing as seen from the unmanned aircraft 10) of the indicator 20 by measurement (step S2).

Next, the control unit 19 acquires the identifier of the indicator 20 from the acquired identification information of the indicator 20 (step S3).

Specifically, the control unit 19 uses preset decode information corresponding to identification information such as a pattern to acquire the identifier decoded to this pattern or the like.

Next, the control unit 19 verifies the acquired identifier against the indicator data 180 in the storage unit 18 and acquires the coordinate information of the indicator 20 having this identifier (step S4).

Then, the control unit 19 references the coordinate information and the bearings of at least two indicators 20 and calculates the own aircraft position of the unmanned aircraft 10 as the intersection of the at least two bearing vectors (step S5). The calculated own aircraft position is used to correct the inertia navigation position output by the inertia navigation device 15.

This enables preferable measurement of the own aircraft position of the unmanned aircraft 10 even when the reliability own position measurement by the inertia navigation device 15 is lost because, for instance, the GPS receiver 14 suffers jamming or spoofing by false signals.

Next, the control unit 19 determines whether the position measurement is to be finished (step S6) and, when the control unit 19 determines that the position measurement is not to be finished (No in step S6), the process proceeds to step S1 above.

In contrast, when the control unit 19 determines that the position measurement is to be finished because, for instance, the unmanned aircraft 10 arrives at the destination or the like (Yes in step S6), the control unit 19 finishes the position measurement.

As described above, in the first example, the identification information provided for the indicator 20 as a unique reflection spectrum, a spectrum change pattern, a hue change pattern, a brightness change pattern, or a temperature change pattern is acquired by the optical sensor 13 mounted in the unmanned aircraft 10. Then, based on the identification information of the indicator 20, the coordinates of the indicator 20 are acquired and the own aircraft position of the unmanned aircraft 10 is calculated.

This can transmit necessary information (coordinates of the indicator 20) to the unmanned aircraft 10 using the spectrum, hue, brightness, or temperature change pattern and cause the unmanned aircraft 10 to acquire the own aircraft position.

Accordingly, the position of the unmanned aircraft 10 can be measured preferably without using external signals.

Furthermore, even when the GPS receiver 14 suffers jamming or spoofing, the own aircraft position can be measured more accurately than the inertia navigation device 15 alone.

It should be noted here that the identification information of the indicator 20 may be encoded coordinate information, not the identifier of the indicator 20. In this case, although the own aircraft position can be calculated without referencing the indicator data 180, the amount of information is larger than an encoded simple identifier.

SECOND EXAMPLE

<Configuration of Position Measurement System>

Next, a configuration of a position measurement system 200 according to a second example of the present invention will be described. It should be noted here that the same components as in the first example are given the same reference numerals and descriptions thereof are omitted.

Figure 5:
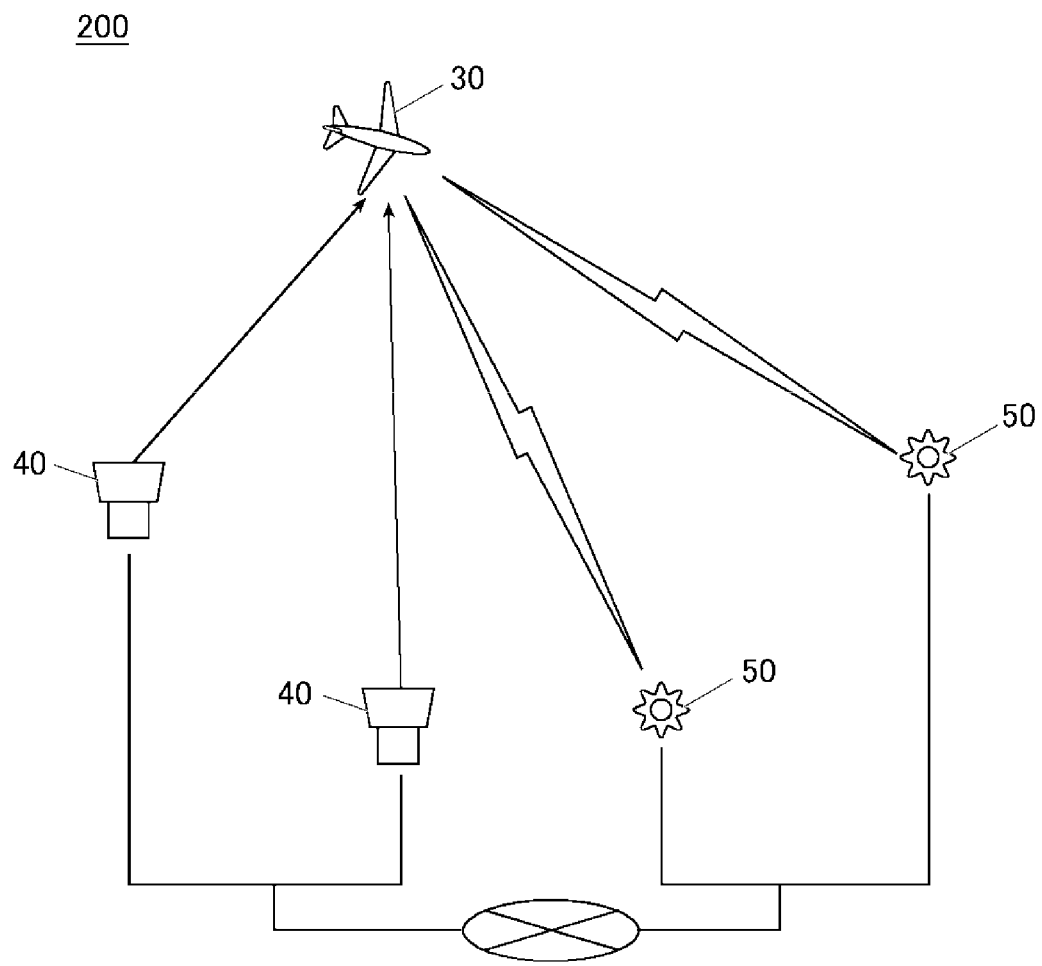
FIG. 5 is a conceptual view illustrating a position measurement system according to a second example.
Figure 6:
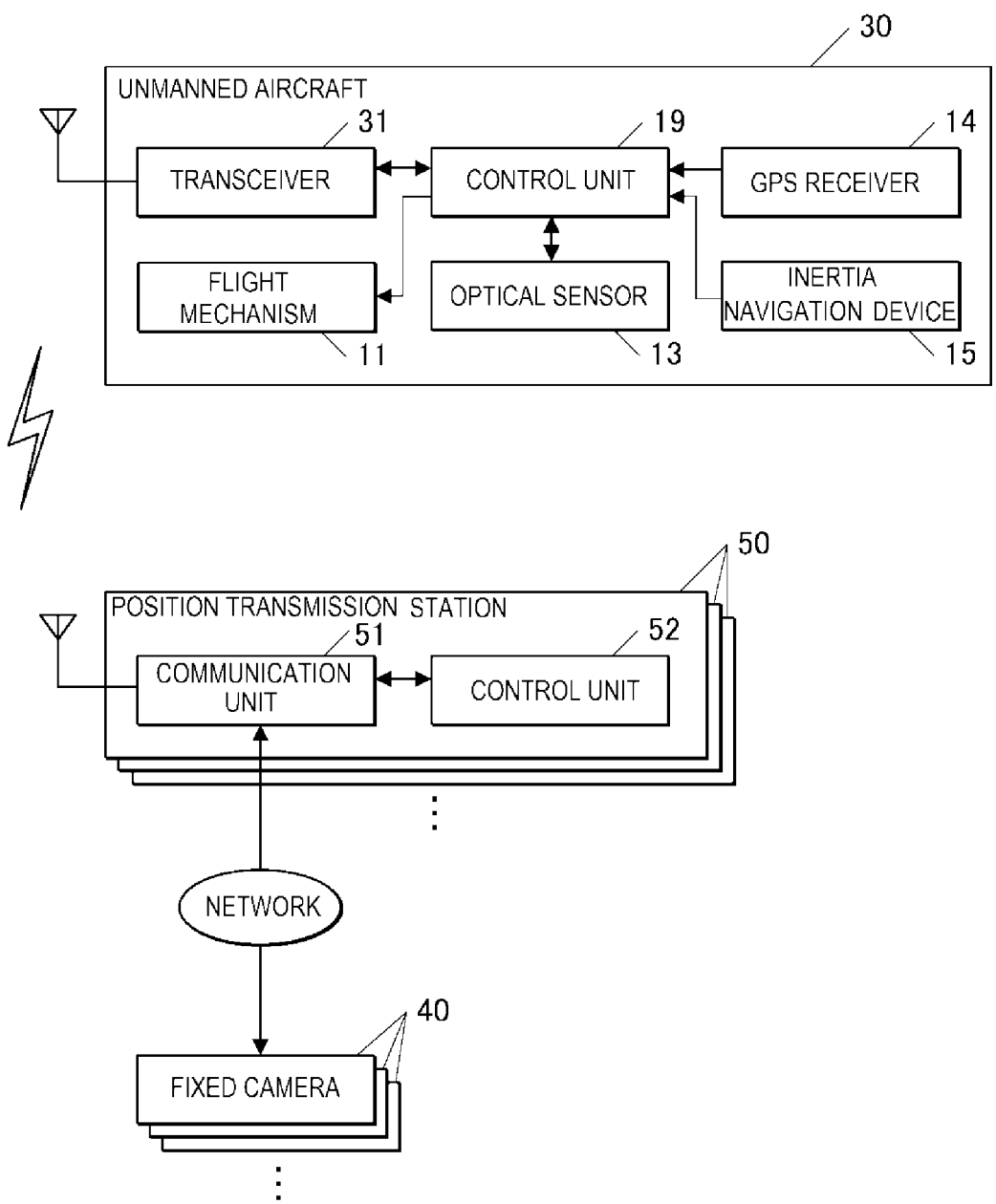
FIG. 6 is a block diagram illustrating a schematic functional configuration of the position measurement system according to the second example.

FIG. 5 is a conceptual view illustrating the position measurement system 200, FIG. 6 is a block diagram illustrating a schematic functional configuration of the position measurement system 200, and FIG. 7 illustrates an example of a transmission form of positional information from a position transmission station 50 in the position measurement system 200.

As illustrated in FIG. 5, the position measurement system 200 includes an unmanned aircraft (pilotless aircraft) 30, a plurality of fixed cameras 40, and a plurality of position transmission stations 50. It should be noted here that FIG. 5 illustrates only two of the fixed cameras 40 and only two of the position transmission stations 50.

As illustrated in FIG. 6, the unmanned aircraft 30 includes the flight mechanism 11, the optical sensor 13, the GPS receiver 14, the inertia navigation device 15, and the control unit 19 as in the unmanned aircraft 10 according to the first example above and further includes a transceiver 31 capable of transmitting and receiving various types of information to or from the position transmission stations 50.

The plurality of fixed cameras 40 are imaging units configured to acquire image information of the unmanned aircraft 30 and are arranged, for instance, along the flight path of the unmanned aircraft 10 while being fixed in predetermined different positions (coordinates) on the land or on the sea. The plurality of fixed cameras 40 is coupled to the position transmission stations 50 via a network through which information can be received and transmitted, so that the image information acquired by the fixed cameras 40 and the information of the imaging bearings are transmitted to the position transmission stations 50 together with the coordinate information of the fixed cameras 40.

It should be noted here that each of the fixed cameras 40 may have a control unit for autonomous control or may be controlled by, for instance, any one of the position transmission stations 50. In addition, the fixed cameras 40 do not need to be arranged along the flight path of the unmanned aircraft 10 as long as they can capture the unmanned aircraft 10 on the flight path.

The position transmission stations 50 are facilities configured to transmit coordinate information to the unmanned aircraft 30 and are disposed, for instance, along the flight path of the unmanned aircraft 10. However, the position transmission stations 50 do not need to be disposed along the flight path as long as they can communicate with the unmanned aircraft 10 on the flight path.

Each of the position transmission stations 50 includes a communication unit 51 and a control unit 52.

The communication units 51 are coupled to the plurality of fixed cameras 40 via the network through which information can be received and transmitted, and receive image information and the like acquired by the fixed cameras 40. In addition, the communication unit 51 can communicate with the transceiver of the unmanned aircraft 30 and transmit coordinate information to the unmanned aircraft 30 in a data transmission form that is not easily intercepted by others.

It is possible to use a data transmission form in which coordinate information encoded by, for instance, the change pattern of information that can be acquired by the optical sensor 13 of the unmanned aircraft 30, as such a data transmission form.

Figure 7A:
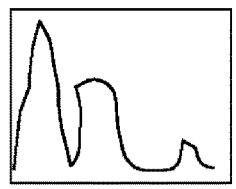
FIG. 7 illustrates an example of the transmission form of position information from a position transmission station according to the second example.

Specifically, for instance, a panel having a special reflection spectrum as illustrated in FIG. 7A is used as a transmitter of the communication unit 51, and coordinate information is transmitted using this reflection spectrum. In this case, the optical sensor 13 needs to capture the spectrum. Since measurement at night is enabled and no change is made, one measurement only takes the imaging time for one image.

Figure 7B:
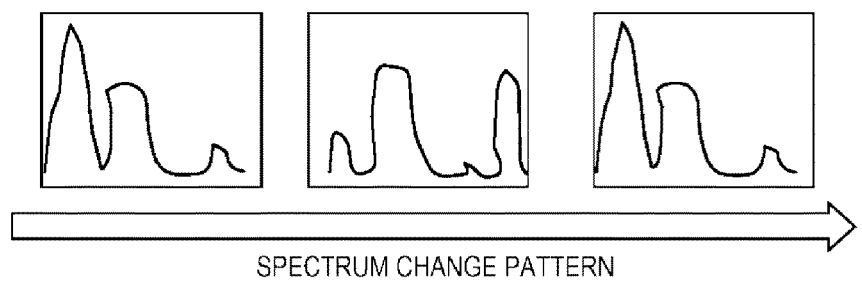

Alternatively, a panel whose spectrum changes in a certain cycle as illustrated FIG. 7B may be used as the transmitter of the communication unit 51, and the coordinate information may be transmitted using the spectrum change pattern.

Figure 7C:
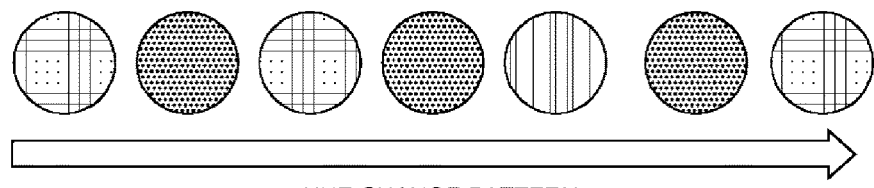

Alternatively, a light fixture whose hue changes in a certain cycle as illustrated FIG. 7C may be used as the transmitter, and the coordinate information may be transmitted using the hue change pattern. In this case, although a relatively cheap sensor capable of capturing visible light is sufficient as the optical sensor 13, this sensor cannot perform measurement at night.

Figure 7D:
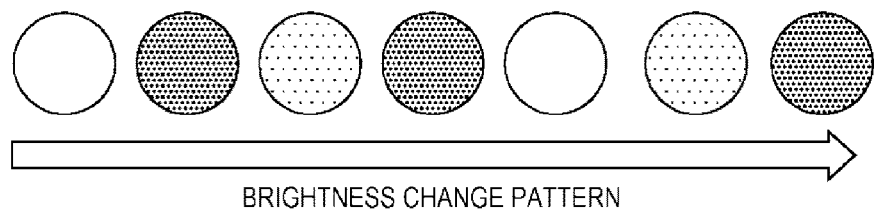

Alternatively, a light fixture or the like whose brightness changes in a certain cycle as illustrated FIG. 7D may be used as the transmitter, and the coordinate information may be transmitted using the brightness change pattern.

Figure 7E:
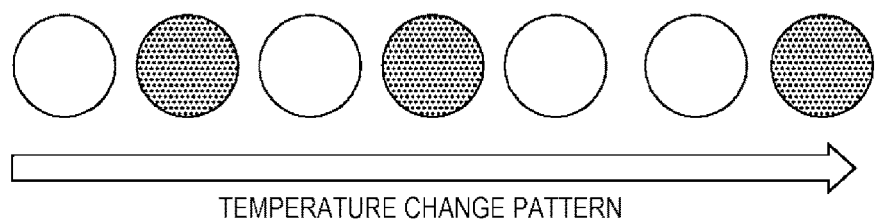

Alternatively, a panel whose temperature changes in a certain cycle as illustrated FIG. 7E may be used as the transmitter, and the coordinate information may be transmitted using the temperature change pattern. In this case, although the optical sensor 13 needs to capture infrared rays, this sensor can perform measurement at night.

In addition, a combination of these data transmission forms may be used as the transmitter that enables data transmission. For instance, the hue change pattern may be used as the data transmission form for daytime and the temperature change pattern may be used as the data transmission form for night time.

The control unit 52 performs centralized control of individual units of the position transmission stations 50, as illustrated in FIG. 6. Specifically, the control unit 52 calculates the position of the unmanned aircraft 30 based on image information and the like acquired from the plurality of fixed cameras 40 or transmits this position information (coordinate information) from the communication unit 51 to the unmanned aircraft 30.

<Position Measurement Method>

Next, a position measurement method used by the unmanned aircraft 30 on the fly acquires the own aircraft position in the position measurement system 200 according to the second example in will be described.

Figure 8:
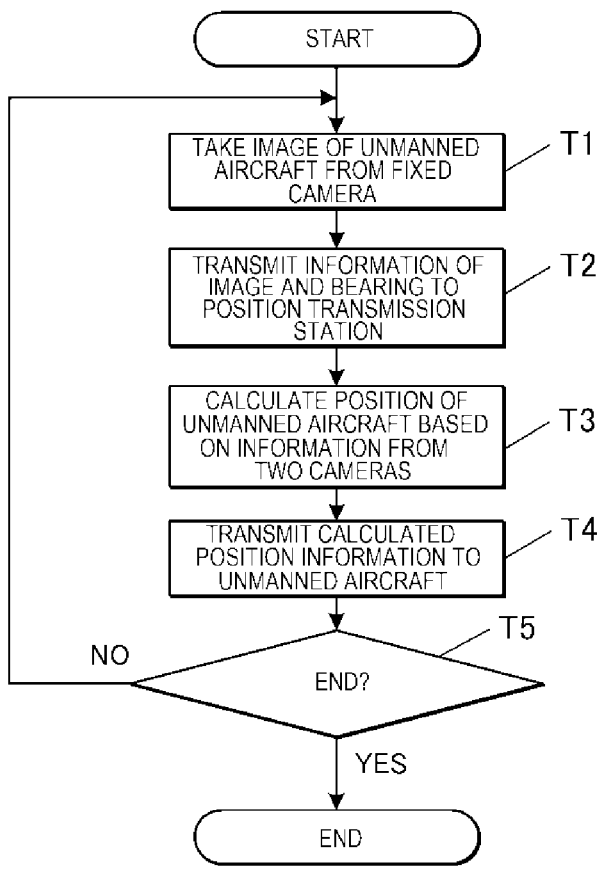
FIG. 8 is a flowchart illustrating a flow of a position measurement method by the position measurement system according to the second example.

FIG. 8 is a flowchart illustrating a flow of this position measurement method.

The position measurement by the position measurement system 200 is performed when it is determined that the reliability of position information included in GPS signals is low because the GPS receiver 14 suffers jamming or spoofing by false signals in the example.

In this position measurement, first, the fixed camera 40 takes an image of the unmanned aircraft 30 on the fly as illustrated in FIG. 8 (step T1).

Then, the taken image information of the unmanned aircraft 30 and the information of the imaging bearing are transmitted to the position transmission station 50 together with the coordinate information of the fixed camera 40 (step T2).

Next, the control unit 52 of the position transmission station 50 calculates the position of the unmanned aircraft 30 based on the transmitted information (step T3).

Specifically, the control unit 52 first calculates the bearing of the unmanned aircraft 30 as seen from the fixed camera 40 based on the image information of the unmanned aircraft 30 and the information of the imaging bearing. Then, the control unit 52 calculates the position of the unmanned aircraft 30 as the intersection of the at least two bearing vectors with reference to the coordinate information of the at least two fixed cameras 40 and the bearings of the unmanned aircraft 30 as seen from the fixed cameras 40.

It should be noted here that the bearing of the unmanned aircraft 30 as seen from the fixed camera 40 may be calculated in advance by the control unit provided in the fixed camera 40 and the bearing and the coordinate information of the fixed camera 40 may be transmitted to the position transmission station 50.

Next, the data about the calculated position of the unmanned aircraft 30 is transmitted from the position transmission station 50 to the unmanned aircraft 30 in the data transmission form that is not easily intercepted (step T4).

Specifically, first, the control unit 52 of the position transmission station 50 encodes the calculated position information (coordinate information) of the unmanned aircraft 30 into information (the unique spectrum or the spectrum, hue, brightness, or temperature change pattern) that can be acquired by the optical sensor 13, and operates the transmitter of the communication unit 51 so as to transmit this information. Then, the control unit 19 of the unmanned aircraft 30 takes an image of the transmitter of the position transmission station 50 using the optical sensor 13 and the unmanned aircraft 30 acquires this information. After that, the control unit 19 uses the preset decoded information corresponding to the acquired information to acquire the position information (coordinate information) decoded to this information. The acquired position information is used to correct the inertia navigation position output by the inertia navigation device 15.

This enables preferable measurement of the own aircraft position of the unmanned aircraft 30 even when the reliability of measurement of the own aircraft position by the inertia navigation device 15 is lost because, for instance, the GPS receiver 14 suffers jamming or spoofing by false signals.

It should be noted here that during this data transmission, the position transmission stations 50 may transmit data to the unmanned aircraft 30 or only the position transmission stations 50 capable of transmitting data to the unmanned aircraft 30 based on the data transmittable ranges (distances) thereof may transmit the data.

Next, the unmanned aircraft 30 and the position transmission stations 50 each determines whether the position measurement is to be finished (step T5) and, when it is determined that the position measurement is not to be finished (No in step T5), the process proceeds to step T1 above.

In contrast, when it is determined that the position measurement is to be finished (Yes in step T5) because, for instance, the unmanned aircraft 30 has reached the destination or the like, the position measurement is finished.

As described above, according to the second example, the position of the unmanned aircraft 30 is calculated based on the coordinates of the fixed cameras 40 having taken images of the unmanned aircraft 30 and the bearings of the unmanned aircraft 30 as seen from the fixed cameras 40. Then, data about the calculated position of the unmanned aircraft 30 is transmitted from the position transmission stations 50 to the unmanned aircraft 30 using the unique spectrum, a spectrum change pattern, a hue change pattern, a brightness change pattern, or a temperature change pattern.

This can transmit necessary information to the unmanned aircraft 30 using a spectrum change pattern, a hue change pattern, a brightness change pattern, or a temperature change pattern and cause the unmanned aircraft 30 to acquire the own aircraft position.

Accordingly, the position of the unmanned aircraft 30 can be measured preferably without using external signals.

Furthermore, even when the GPS receiver 14 suffers jamming or spoofing, the own aircraft position can be measured more accurately than the inertia navigation device 15 alone.

In addition, since an encoded special data transmission form is used, it is possible to make interception by others more difficult than wide area radio wave transmission.

MODIFIED EXAMPLES

It should be noted here that examples to which the present invention is applicable are not limited to the two example described above and that changes can be made as appropriate without departing from the spirit of the present invention.

For instance, in the above examples, the position of the unmanned aircraft can be calculated when at least two indicators 20 or fixed cameras 40 are present (that is, when two sets of coordinates and a bearing can be acquired).

However, when a distance measurement unit is provided in the unmanned aircraft 10 or the fixed camera 40 so that the distance between the indicator 20 or the fixed camera 40 and the unmanned aircraft can be measured, one position can be calculated by only one indicator 20 or only one fixed camera 40.

In addition, in the above examples, the position measurement of the unmanned aircraft is performed by the position measurement system when it is determined that the reliability of position information included in GPS signals is low. However, the position measurement may be performed at all times.

In addition, the indicators 20 according to the first example may be provided on the land, on the sea, or the air as long as the indicators 20 are fixed at known coordinates.

In addition, the fixed cameras 40 according to second example do not need to be fixed as long as the fixed cameras 40 are provided at known coordinates. For instance, the fixed cameras 40 may be replaced with cameras installed in an unmanned aircraft whose position can detected accurately.

Furthermore, the fixed cameras 40 according to the second example may be replaced with, for instance, a radar as long as information about the position of the unmanned aircraft (movable body) can be acquired. When a radar is used, unlike the fixed cameras, only one radar can be used to identify the position of the unmanned aircraft (movable body).

In addition, particular shapes (or patterns or changes in shapes or patterns) of the indicators 20 may be used as the identification information of the indicators 20 according to the first example.

In addition, in the data transmission form by the position transmission stations 50 according to the second example, the communication units 51 may have directional antennas corresponding to the unmanned aircraft 30 so as to transmit data via radio waves. In this case, the control units 52 of the position transmission stations 50 may orient the directional antennas to the position (direction) of the unmanned aircraft 30 so as to transmit the position information of the unmanned aircraft 30 via radio waves.

In addition, the movable bodies according to the examples of the present invention are not limited to unmanned aircrafts (pilotless aircrafts) and may be, for instance, manned aircrafts, or manned or unmanned ships or vehicles.

The invention claimed is:

1. A position measurement system for a movable body, comprising:
 a movable body; and
 at least one indicator comprising identification information, wherein the movable body comprises
  an optical sensor configured to acquire an image of the indicator,
  an information acquisition unit configured to acquire the identification information of the indicator and a bearing of the indicator as seen from the movable body on a basis of the image of the indicator acquired by the optical sensor,
  a coordinate acquisition unit configured to acquire coordinates of the indicator on a basis of the acquired identification information of the indicator, and
  a position calculation unit configured to calculate a position of the movable body on a basis of the acquired bearing of the indicator and the acquired coordinates of the indicator, and
 the indicator comprises, as the identification information, at least one of a spectrum change pattern over a periodic cycle, a hue change pattern over the periodic cycle, a brightness change pattern over the periodic cycle, or a temperature change pattern over the periodic cycle.

2. The position measurement system for a movable body according to claim 1, wherein
 the at least one indicator comprises at least two indicators that are fixed in different positions, each of the indicators having unique identification information,
 the movable body comprises a storage unit that stores, in advance, indicator data representing an association between the identification information and coordinates of each of the at least two indicators,
 the coordinate acquisition unit acquires the coordinates of the indicators with reference to the indicator data based on the acquired identification information of the indicators, and
 the position calculation unit calculates the position of the movable body on the basis of the bearings and coordinates of the at least two indicators.

3. The position measurement system for a movable body according to claim 2, wherein the at least two indicators are arranged so that the at least two indicators can be captured by the optical sensor of the movable body on a movement path.

4. The position measurement system for a movable body according to claim 1, wherein
 the movable body comprises
  an aircraft,
  a GPS receiver configured to receive a GPS signal including position information from a GPS satellite, and an inertia navigation device configured to correct and measure an own aircraft position of the movable body on a basis of the GPS signal, and the position measurement system measures the position of the movable body when it is determined that reliability of the position information included in the GPS signal is low.

5. The position measurement system for a movable body according to claim 2, wherein the movable body comprises
an aircraft,
a GPS receiver configured to receive a GPS signal including position information from a GPS satellite, and
an inertia navigation device configured to correct and measure an own aircraft position of the movable body on a basis of the GPS signal, and the position measurement system measures the position of the movable body when it is determined that reliability of the position information included in the GPS signal is low.

6. The position measurement system for a movable body according to claim 3, wherein the movable body comprises
an aircraft,
a GPS receiver configured to receive a GPS signal including position information from a GPS satellite, and
an inertia navigation device configured to correct and measure an own aircraft position of the movable body on a basis of the GPS signal, and the position measurement system measures the position of the movable body when it is determined that reliability of the position information included in the GPS signal is low.

7. The position measurement system for a movable body according to claim 1, wherein the movable body comprises an unmanned aircraft.

8. The position measurement system for a movable body according to claim 2, wherein the movable body comprises an unmanned aircraft.

9. The position measurement system for a movable body according to claim 3, wherein the movable body comprises an unmanned aircraft.

10. The position measurement system for a movable body according to claim 1, wherein the identification information includes a first identification information used for day time, and a second identification information used for night time, the first identification information denotes the hue change pattern over the periodic cycle, and the second identification information denotes the spectrum change pattern over the periodic cycle or the temperature change pattern over the periodic cycle.

* * * * *